July 13, 1926.
F. JOKEL
1,592,026
SOUND BOX FOR LOUD SPEAKERS, TELEPHONES, AND THE LIKE
Filed Oct. 1, 1924
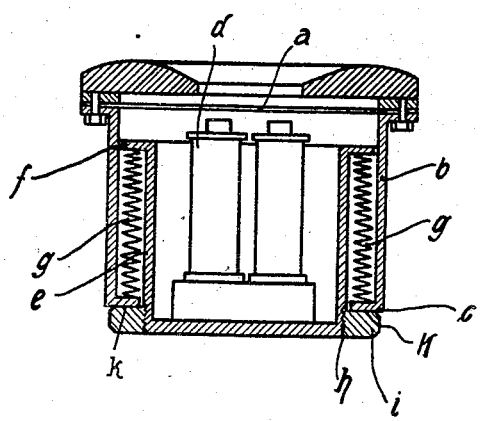

Patented July 13, 1926.

1,592,026

UNITED STATES PATENT OFFICE.

FRANZ JOKEL, OF BERLIN, GERMANY, ASSIGNOR TO CARL LINDSTRÖM AKTIEN-GESELLSCHAFT, OF BERLIN, GERMANY.

SOUND BOX FOR LOUD SPEAKERS, TELEPHONES, AND THE LIKE.

Application filed October 1, 1924, Serial No. 741,022, and in Germany July 26, 1924.

This invention relates to sound boxes for loud speakers, telephones, and the like.

In the sound boxes for electrical transmission as heretofore known and used for telephones, loud speakers, recording apparatus and the like, screw threads are provided for the adjustment or the regulation of the distance between the diaphragm and the magnetic system, and by means of which the parts of the sound box which carry the diaphragm and the magnetic system are adjusted relatively to each other.

The disadvantage of these arrangements was that, owing to the lost motion of the screw threads, albeit small, the necessary accuracy of adjustment could not be secured, this disadvantage being still further increased by the fact that only comparatively small bearing surfaces could be provided on the parts moved relatively to each other so that an accurate and fixed distance between the diaphragm and the magnetic system could not be obtained. Moreover, there was the disadvantage that the magnetic system and the diaphragm were rotated relatively to one another during the adjustment so that further inaccuracies in respect of the adjustment of the necessary distance between these parts were caused.

According to the present invention the disadvantages above referred to of the sound boxes as heretofore constructed are avoided by interposing springs between the parts of the sound box which move relatively to each other and which respectively carry the diaphragm and the magnetic system or the like. By providing adjusting devices, such as nuts, subject to the pressure of these springs, for the relative adjustment of the parts of the sound box, all lost motion in the screw thread of the nuts is avoided, and as these latter may also be provided with a sufficiently large bearing surface accurate axial guiding of the parts with relation to each other is ensured. Furthermore all rotation of the magnetic system relatively to the diaphragm is prevented.

In order that the said invention may be clearly understood and readily carried into effect, the same will now be described more fully with reference to the accompanying drawing, which shows in vertical section one constructional form by way of example of a device in accordance with the present invention.

The diaphragm $a$ is mounted in the well known manner on the cap $b$ which forms the outer casing of the sound box and which is provided with an inwardly flanged edge $c$.

In the interior of the cap $b$ there is arranged the sleeve $e$ which carries the magnetic system (the solenoid or the like) and which likewise is conveniently provided with a flange $f$. Between the flanges $c$ of the cap $b$ and the flange $f$ of the sleeve $e$ are arranged any desired number of pressure springs $g$ which tend to bring the sleeve $e$ with the magnetic system $d$ nearer to the diaphragm $a$.

The sleeve $e$ is provided at its lower part with a screw thread $h$ with which an annular nut $i$ engages, which nut bears with a sufficiently large bearing surface $k$ against the underside of the flange $c$ on the cap $b$.

For the purpose of adjusting or regulating the distance between the magnetic system $d$ and the diaphragm $a$, it is only necessary to adjust the nut $i$, which may have a milled edge or the like, to enable the sleeve $e$ with the magnetic system $d$ to be moved away from the diaphragm against the action of the pressure springs $g$, or towards the diaphragm under the action of the pressure springs $g$ by rotating the nut in the opposite direction and so be firmly held at the desired distance.

As the two parts of the sound box are not themselves connected together by screw threads, no relative rotation of the magnetic system and the diaphragm takes place. Furthermore the arrangement of the independently provided nut $i$, which is subject to the pressure of the springs, makes it possible to give this nut a large bearing surface on the cap $c$ and one which can be accurately machined, so that the necessary fine adjustment can be made with the desired degree of accuracy.

It will of course be understood that instead of the pressure $g$, tension springs may also be employed to connect the two relatively movable parts of the sound box.

Having now fully described my invention what I claim and desire to protect by Letters Patent of the United States of America is:

A sound box for electrically transmitting sounds in loud speakers, telephones and the like, comprising a cap having a diaphragm therein and also having an inwardly extending flange at the end opposite the diaphragm; a sleeve slidably arranged in the cap and provided at the end nearest the diaphragm with an outwardly extending flange which is slidable in the cap, electromagnets in the sleeve and movable therewith toward and from the diaphragm, a nut threaded on the outer end of the sleeve and bearing against the corresponding end of the cap, and springs arranged between the walls of the cap and sleeve, bearing between said flanges and tending to move the sleeve and the electromagnets toward the diaphragm.

In testimony whereof, I affix my signature.

FRANZ JOKEL.